(12) United States Patent
Salamat et al.

(10) Patent No.: US 12,210,945 B2
(45) Date of Patent: Jan. 28, 2025

(54) METHODS AND SYSTEMS CONFIGURED TO SPECIFY RESOURCES FOR HYPERDIMENSIONAL COMPUTING IMPLEMENTED IN PROGRAMMABLE DEVICES USING A PARAMETERIZED TEMPLATE FOR HYPERDIMENSIONAL COMPUTING

(71) Applicant: The Regents of the University of California, Oakland, CA (US)

(72) Inventors: Sahand Salamat, San Diego, CA (US); Mohsen Imani, San Diego, CA (US); Behnam Khaleghi, San Diego, CA (US); Tajana Rosing, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 923 days.

(21) Appl. No.: 17/236,640

(22) Filed: Apr. 21, 2021

(65) Prior Publication Data

US 2021/0334703 A1 Oct. 28, 2021

Related U.S. Application Data

(60) Provisional application No. 62/980,106, filed on Feb. 21, 2020.

(51) Int. Cl.
*G06N 20/00* (2019.01)
*G06F 15/80* (2006.01)

(52) U.S. Cl.
CPC ............. *G06N 20/00* (2019.01); *G06F 15/80* (2013.01)

(58) Field of Classification Search
CPC ................................ G06N 20/00; G06F 15/80
See application file for complete search history.

(56) References Cited

U.S. PATENT DOCUMENTS 11,663,067 B2 * 5/2023 Anghel ................. G06N 3/045
706/21
2016/0321113 A1 * 11/2016 Pinto ................... G06F 9/45558
(Continued)

OTHER PUBLICATIONS

M. Schmuck, L. Benini, and A. Rahimi, "Hardware optimizations of dense binary hyperdimensional computing: Rematerialization of hypervectors, binarized bundling, and combinational associative memory," arXiv preprint arXiv:1807.08583, 2018.
(Continued)

*Primary Examiner* — James T Tsai
(74) *Attorney, Agent, or Firm* — Stanek Lemon Crouse and Meeks, PA

(57) ABSTRACT

A method of defining an implementation of circuits in a programmable device can be provided by receiving a plurality of specifications for a hyperdimensional (HD) computing machine learning application for execution on a programmable device, determining parameters for a template architecture for HD computing machine learning using the plurality of specifications, the template architecture including an HD hypervector encoder, an HD associative search unit, programmable device pre-defined processing units, and programmable device pre-defined processing elements within the pre-defined processing units, and generating programmable device code configured to specify resources to be allocated within the programmable device using pre-defined circuits defined for use in the programmable device using the determined parameters for the template architecture.

18 Claims, 12 Drawing Sheets

(56) References Cited

U.S. PATENT DOCUMENTS

2018/0286038 A1* 10/2018 Jalali .................... G06V 20/695
2019/0050715 A1* 2/2019 Ooi ........................ G06N 3/063

OTHER PUBLICATIONS

M. Imani et al., "Fach: Fpga-based acceleration of hyperdimensional computing by reducing computational complexity," in ASP-DAC, IEEE, 2019.

* cited by examiner

| Application | Binary | | Power-of-two | | Fixed-point | |
|---|---|---|---|---|---|---|
| | Accuracy | Exe time | Accuracy | Exe time | Accuracy | Exe time |
| Speech Recognition | 88.1% | 1.6ms | 90.3% | 3.4ms | 95.5% | 10.5ms |
| Activity Recognition | 77.4% | 0.6ms | 88.0% | 1.3ms | 94.6% | 3.4ms |
| Face Recognition | 48.5% | 0.7ms | 89.6% | 1.6ms | 96.9% | 4.6ms |
| Physical Monitoring | 85.7% | 1.1ms | 90.8% | 2.4ms | 94.5% | 7.8ms |

| #Features | 64 | 128 | 256 | 432 | 512 |
|---|---|---|---|---|---|
| Baseline | 975 | 449 | 254 | 128 | 110 |
| F5-HD | 1505 | 837 | 481 | 243 | 211 |

| Resource utilization | Fixed-point | Power-of-two | Binary |
|---|---|---|---|
| LUT | 46% | 95% | 82% |
| BRAM | 47% | 46% | 5% |
| DSP | 89% | 26% | 29% |
| Power(W) | 9.8 | 14.8 | 13.9 |

FIG. 10

| FPGA model | Power budget | Fixed-point | | Power-of-two | | Binary | |
|---|---|---|---|---|---|---|---|
| | | TP | ΔP | TP | ΔP | TP | ΔP |
| Virtex | 50% | 2.7 (0.44×) | 5.2% | 5.1 (0.53×) | 5.2% | 6.3 (0.60×) | 2.4% |
| | 25% | 1.2 (0.19×) | 10.8% | 1.6 (0.16×) | 7.0% | 2.6 (0.25×) | 8.0% |
| Spartan | 50% | 0.2 (0.38×) | 12.8% | 0.7 (0.37×) | 5.1% | 1.0 (0.40×) | 5.1% |
| | 25% | 0.1 (0.21×) | 9.1% | 0.3 (0.17×) | 16% | 0.6 (0.21×) | 17% |
| Kintex | 50% | 1.0 (0.41×) | 5.2% | 2.5 (0.45×) | 6.8% | 4.8 (0.65×) | 4.0% |
| | 25% | 0.4 (0.18×) | 12.1% | 1.3 (0.24×) | 18% | 1.7 (0.25×) | 12% |

FIG. 12

METHODS AND SYSTEMS CONFIGURED TO SPECIFY RESOURCES FOR HYPERDIMENSIONAL COMPUTING IMPLEMENTED IN PROGRAMMABLE DEVICES USING A PARAMETERIZED TEMPLATE FOR HYPERDIMENSIONAL COMPUTING

CLAIM FOR PRIORITY

This application claims priority to Provisional Application Ser. No. 62/980,106, filed on Feb. 21, 2020 titled F5-HD: FAST FLEXIBLE FPGA-BASED FRAMEWORK FOR REFRESHING HYPERDIMENSIONAL COMPUTING, the entire disclosure of which is hereby incorporated herein by reference.

STATEMENT OF GOVERNMENT SUPPORT

This invention was made with government support under Grant No. HR0011-18-3-0004 awarded by the Department of Defense Advanced Research Projects Agency (DARPA) and Grant Nos. 1527034 and 1730158 awarded by the National Science Foundation. The government has certain rights in the invention.

BACKGROUND

Methods and apparatus, including computer program products, are provided for machine learning and hyperdimensional computing.

Hyperdimensional (HD) computing is a computational approach that builds upon imitating the brain functionality in performing cognitive tasks. In fact, brain computes with patterns of neural activity, which can be realized by points in a hyperdimensional space, called hypervectors. By leveraging a non-complex and parallel set of operations on such ultra-wide vectors, HD affords promising capabilities in learning and classification applications including but not limited to language, speech, activity, and face recognition as well as classification of time-series signals. In addition to its inclusive cognitive application space and comparatively simpler computation model than other learning paradigms, HD computing is inherently robust against failures as the information in a hypervector is uniformly distributed over all of its comprising dimensions. Moreover, HD is able to yield the accuracy of state-of-the-art while learning from only a small portion of the original training data.

HD computing is involved with constituting of and processing on hypervectors, wherein a hypervector comprises thousands of bits. For training, first, it generates a fixed set of orthogonal hypervectors each of which represents a specific feature level. Afterward, for a given input (as a preprocessed set/vector of features), it maps each feature of the input vector to the corresponding predetermined hypervector. Eventually, all the hypervectors are aggregated, which is basically performed by adding them up. Since the spatial or temporal location of the features does matter, the aggregation also incorporates shift operation on the representing vectors to retain the indices of the input features. After all input data are mapped to a final encoded hypervector, all encoded hypervectors belonging to the same class (label) are summed up to form the final representative hypervector of the class. Inference in HD computing is analogous; albeit the encoded hypervector passes through an associative search (a.k.a similarity check) with the representative hypervectors to identify the associated class.

The encoding and classifying stages of HD computing require a substantial number of bit-level addition and multiplication operations, which can be effectively parallelized. These operations can also be segregated (and hence, pipelined) in the granularity of dimension level. Though they may vary in the number of input features and output classes, all HD applications follow the same computation flow, albeit with a controllable degree of parallelism and pipeline. Such characteristics of HD computing inimitably matches with the intrinsic capabilities of FPGAs, making these devices a unique solution for accelerating these applications; however, implementing applications on FPGAs is a time consuming process.

SUMMARY

Embodiments according to the present invention can provide methods and systems configured to specify resources for hyperdimensional computing implemented in programmable devices using a parameterized template for hyperdimensional computing. Pursuant to these embodiments, A method of defining an implementation of circuits in a programmable device can be provided by receiving a plurality of specifications for a hyperdimensional (HD) computing machine learning application for execution on a programmable device, determining parameters for a template architecture for HD computing machine learning using the plurality of specifications, the template architecture including an HD hypervector encoder, an HD associative search unit, programmable device pre-defined processing units, and programmable device pre-defined processing elements within the pre-defined processing units, and generating programmable device code configured to specify resources to be allocated within the programmable device using pre-defined circuits defined for use in the programmable device using the determined parameters for the template architecture.

BRIEF DESCRIPTION OF THE DRAWINGS

The accompanying drawings shown in the Appendix, which are incorporated in and constitute a part of this specification, show certain aspects of the subject matter disclosed herein and, together with the description, help explain some of the principles associated with the disclosed implementations.

Like reference symbols in the various drawings indicate like elements.

FIG. 3 is a table illustrates classification accuracy and performance of binary, power-of-two, and 8-bits fixed-point HD models on CPU in some embodiments according to the invention.

FIG. 6 is a table of the maximum number of generated encoded dimensions per cycle using Kintex FPGA in some embodiments according to the invention.

FIG. 10 is a table of average resource utilization and power consumption of F5-HD implemented on Kintex in some embodiments according to the invention.

FIG. 12 is a table of F5-HD implementation under power constraints in some embodiments according to the invention.

DETAILED DESCRIPTION OF EMBODIMENTS ACCORDING TO THE INVENTION

As described herein, F5-HD is an automated FPGA-based framework for accelerating HD computing that abstracts away the implementation complexities and long design cycles associated with hardware design from the user. F5-HD generates a synthesizable Verilog implementation of HD accelerator while taking the high-level user and target FPGA parameters into account. Essentially, F5-HD customizes upon a hand-optimized, fully-pipelined template processing element that can be parallelized according to the user-specified constraints (viz., accuracy and power). F5-HD supports both training and inference as well as model refinement through online, simultaneous, training and inference, so the model can be calibrated without interrupting the normal operation of the system.

In some embodiments according to the present invention, F5-HD provides a template-based framework that generates FPGA-based synthesizable architectures for accelerating HD computing.

In some embodiments according to the present invention, F5-HD provides a novel hardware-friendly encoding approach that reduces the required Block RAM accesses, hence, enhances resource utilization.

In some embodiments according to the present invention, F5-HD provides the flexibility of customized accuracy by supporting different data-types (viz., fixed-point, binary, and power-of-two), and of customized power consumption bound by trading the parallelism.

In some embodiments according to the present invention, F5-HD provides simultaneous training and inference to refine the model without interrupting the system functionality.

Our evaluations using different classification benchmarks revealed that, in high-accuracy mode, F5-HD can provide 86.9× and 7.8× (11.9× and 1.7×) higher energy efficiency improvement and faster training (inference) as compared to an optimized implementation of HD on AMD R9 390 GPU, respectively. In the fastest mode in which each dimension is represented by a single bit (i.e., binary), F5-HD achieves 4.3× higher throughput and 2.1× throughput/Watt as compared to the baseline F5-HD using fixed-point values, while providing in average 16.5% lower classification accuracy. In addition, we observe that F5-HD framework can ensure the power consumption to be within 9.0% of the user-defined constraint, on average.

HD computing builds on the fact that the cognitive tasks of the human brain can be explained by mathematical operations on ultrawide hypervectors. In other words, brain computes with patterns of neural activity, which can be better represented by hypervectors rather than scalar numbers. A hypervector comprises $D_{hv}$, e.g., 10,000 bits, independent components (dimensions) whereby the enclosed information is distributed uniformly among all $D_{hv}$ dimensions. This makes hypervectors robust to failure as the system remains functional under a certain number of component failings, and as degradation of information does not depend on the position of the failing components.

Figure 1:
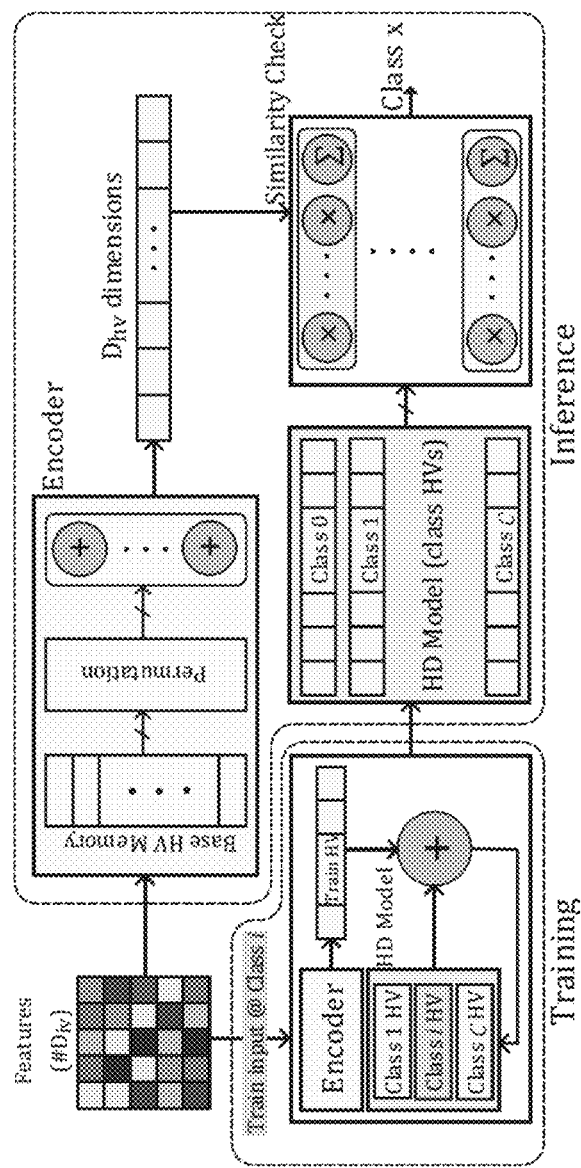
FIG. 1 is an overview of hyperdimensional learning and inference in some embodiments according to the invention.

As demonstrated in FIG. 1, training an HD model involves a three-step procedure as follows. First, it initializes base hypervectors, each of which corresponds to a specific input feature level. Indeed, input of the HD algorithm is a feature vector $\vec{V}_{iv}$ with $D_{iv}$ dimensions (elements) wherein each dimension represents a feature value $\mathcal{F}$ that has $t_{iv}$ levels:

$$\vec{V}_{iv} = \langle v_0, v_1, \ldots, v_{D_{iv}} \rangle$$

$$|v_1| \in (\mathcal{F}_0, \mathcal{F}_1, \ldots \mathcal{F}_{t_{iv}}) \quad (1)$$

Though it is application-dependent, typical values for $D_{iv}$ and $t_{iv}$ might be, respectively, 100s and four-eight for which $t_{iv}$ can be represented by two-three bits. Each of $D_{iv}$ features in the feature vector needs to be mapped to a base hypervector with $D_{hv}$ dimensions for subsequent processing. Therefore, to represent all possible $t_{iv}$ values of features, $t_{iv}$ different hypervectors with $D_{hv}$ dimensions, namely base hypervectors, are needed. The base hypervectors are generated according to the attribute of the feature vector. In the cases that feature levels are independent and irrelevant, base hypervectors can be selected randomly, hence orthogonal. In such cases, the expected Hamming distance between two (out of $t_{iv}$) base hypervectors is $\sim D_{hv}/2$. However, for the cases that each feature level is a meaningful quantity, e.g., a continuous signal quantized to $t_{iv}$ levels, the distance between the hypervectors of two feature levels should correspond to their actual difference. For these cases, the base hypervector associated with the lowest feature level is generated randomly. Afterward, a random half ($D_{hv}/2$) of its bits are flipped to produce an orthogonal base hypervector representing the other side of the horizon, i.e., the highest level of a feature. The remaining base hypervectors are generated by flipping $$\frac{D_{hv}/2}{t_{iv}-1}$$

of each consecutive hypervector pair, starting from the initial base hypervector.

After specifying the base hypervectors, each element vi of a given input feature vector is mapped to its associated base hypervector $hv_{vi}$ for subsequent processing. Nonetheless, as in most applications the spatial and/or temporal position of an input feature often do matter, i.e., whenever a sequence of the input features should be traced such as image and speech inputs, the encoding procedure takes the locality into account by introducing permutation operation $P^{(i)}$ (which denotes i-bits cyclic left shift) on the input features before aggregation. Due to the large dimension and randomness of the base hypervectors, $P^{(i)}$ keeps a hypervector and its resultant shift orthogonal. Eventually, the mapped hypervectors are aggregated according to Equation 2 to build the query hypervector:

$$\vec{\mathcal{H}} = h\vec{v}(\vec{V}_{iv}) = \sum_{i=0}^{D_{iv}} \mathcal{P}^{(i)}(h\vec{v}_{v_1}) \quad (3)$$

Which can be reformulated as:

$$hv(\vec{V}_{iv}) = h\vec{v}_{v_1} + (h\vec{v}_{v_1} << 1) + \cdots + (h\vec{v}_{v_{D_{iv}}} \nless \mathcal{D}_{iv}) \quad (2)$$

After mapping each training input $\vec{V}_{iv}$ to hypervector $\vec{\mathcal{H}}$ as above, all hypervectors belonging to the same class (label) are simply summed to form the final representative hypervectors.

Thus, assuming $\vec{\mathcal{H}}^l = \langle h_0, h_1, \ldots, h_{D_{hv}}\rangle^l$ denotes a generated class hypervector for an input data with label l, the final (representative) class hypervectors are obtained as Equation 4, in which each dimension $c_k$ is obtained through dimension-wise addition of all $h_k^l$'s, and $\mathcal{J}$ is the number of input data with label l.

$$\vec{C}_l = (c_0, c_1, \cdots, c_{D_{hv}}) = \sum_{j=0}^{\mathcal{J}} \mathcal{H}_j^l \quad (4)$$

All dimensions of a class hypervector ($\vec{C}$) have the same bit-width which can have various representation, e.g., binary (hence one bit), power-of-two ($2^n$), fixed-point (integer), etc. This makes a trade-off between accuracy, performance, and hardware complexity. The base of hypervectors are converted through thresholding. For instance, for $\mathcal{J}$ hypervectors $\vec{\mathcal{H}}_j^l$ constituting class $\underline{C}_j$, the binarized class can be obtained as follows.

$$\vec{C}_l' = (c_0^1, c_1', \cdots, c_{D_{hv}}'), c_k' = \begin{cases} 0 & c_k < \frac{\mathcal{J}}{2} \\ 1 & \text{otherwise} \end{cases} \quad (5)$$

The first steps of inference in HD computing is similar to training; an input feature vector is encoded to $D_{hv}$-dimension query hypervector $\vec{\mathcal{H}}$. following Equation 3. This is followed by a similarity check between the query hypervector $\vec{\mathcal{H}}$, and all representative class hypervectors, $\underline{C}_j$. The similarity in the fixed-point and power-of-two number representations is defined as calculating the cosine similarity, which is obtained by multiplying each dimension in the query vector to the corresponding dimension of the class hypervectors, and adding up the partial products:

$$\text{similarity}(\vec{\mathcal{H}}, \vec{C}_l) = \sum_{j=0}^{D_{hv}} h_k \cdot c_k \quad (6)$$

The class with the highest similarity with the query hypervector indicates the classification result. The number of classes is application dependent and determined by the user. This can be as simple as two classes, denoting face vs. non-face in a face-detection algorithm. Similarity checking in binarized HD model (i.e., 1-bit dimensions) simplifies to the Hamming distance between the query and class vectors, which can be carried out by a bitwise XNOR, followed by a reduction operation.

Retraining might be used to enhance the model accuracy by calibrating it either via new training data or by multiple iterations on the same training data. Retraining is basically done by removing the mispredicted query hypervectors from the mispredicted class and adding it to the right class. Thus, for a new input feature vector $\vec{V}_{in}$ with query hypervector $\vec{\mathcal{H}}$, belonging actually to class with hypervector $\vec{C}_l$, if the current model predicts the class $\vec{C}_{l'}$, where $\vec{C}_{l'} \neq \vec{C}_l$, the model updates itself as follows:

$$\vec{C}_l = \vec{C}_l + \vec{\mathcal{H}}$$

$$\vec{C}_{l'} = \vec{C}_{l'} - \vec{\mathcal{H}} \quad (7)$$

This, indeed, reduces the similarity between $\vec{\mathcal{H}}$ and mispredicted class $C_{l'}$, and adds $\vec{\mathcal{H}}$, to the correct class Cl to increase their similarity and the model will be able to correctly classify such query hypervectors.

F5-HD is configured to abstract away the complexities behind employing FPGAs for accelerating AI applications. F5-HD is an automated framework that generates synthesizable FPGA-based HD implementation in Verilog, considering the user-specified criteria, e.g., power budget, performance-accuracy trade-off, and FPGA model (available resources). F5-HD combines the advantages of hand-optimized HDL design with the bit-level yet flexible manageability of FPGA resources, which is in concordance with bitwise operations associated with HD computing, to accelerate these applications.

Figure 2:
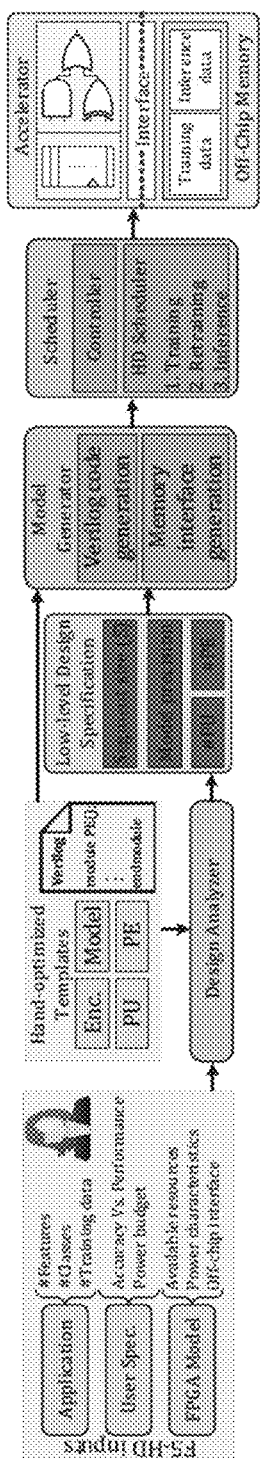
FIG. 2 is an overview of the proposed framework, F5-HD in some embodiments according to the invention.

FIG. 2 demonstrates F5-HD's workflow. The framework starts with specifying the application specifications, viz., the number of classes, features (i.e., input vector dimensions $D_{iv}$, as well as the number of features different levels, $t_{iv}$) and the number of training data. The user also determines the target FPGA model, hence F5-HD can get the number of available resources from a predefined library. F5-HD currently supports Xilinx 7-series FPGAs, including Virtex-7, Spartan-7, and Kintex-7 families. This can be readily extended to other FPGA families. In addition, the user can dictate constraints on the power as well as performance-accuracy trading.

Thereafter, F5-HD's design analyzer determines the number of resources according to the user's specification. F5-HD exploits a parameterized template architecture, mainly composed of an encoder; an associative search unit, including Processing Units and Processing Elements; as well as an HD model module that stores and updates the class hypervectors. The design analyzer determines the number of Processing Units (PUs), Processing Elements (PEs) as well as the type and number of dimension-wise functional units within each PE, according to the desired accuracy level and available resources. All the function units, e.g., encoder and PUs, utilize a specific set of building blocks with foreknown resource utilization. Thus, F5-HD design analyzer can readily figure out the parameters of the template architecture, e.g., maximum parallelization level of the encoder and number of PEs per PU, based on their required resources (LUT, BRAM, and DSP) and the available resources.

If a power budget is defined by the user, the design analyzer tries to find out the maximum number of PEs that can be generated, without violating the constraints. For this regard, F5-HD estimates the power of resources, e.g., LUTs, flip-flops, DSPs, BRAMs, etc. using Xilinx Power Estimator (XPE). This requires calculating the expected activity of the resources, which is straightforward owing to the foreknown homogeneous structure of the generated architectures and the expected probability of the hypervectors at the level of the dimension. Another constraint is performance-accuracy trade-off wherein the user chooses between the highest performance with relatively lower accuracy, mediocre, and low performance with the highest accuracy. The available modes are currently fixed-point (8-bits integer representation), power-of-two in which hypervector dimensions are four-bits values that represent the exponent, and binary (i.e., each dimension is represented by one bit). It is noteworthy that the power and accuracy constraints can be applied concurrently, which provides the user with the flexibility to adapt F5-HD based on their application criteria. For instance, for real-time low-power applications, the user might specify their power budget with the binary mode of operation. The output of design analyzer is basically the number of PUs and PEs (per PU), the number of multipliers (in the case of fixed-point model) per PE, and the parallelization level of the encoder, i.e., the number of hypervector dimensions it can produce at each cycle.

After the design analyzer specified the parameters of the template architecture, F5-HD's model generator, automatically generates the Verilog implementation of F5-HD using hand-optimized template blocks. This includes instantiating the PUs, PEs, the Block RAMs, and off-chip memory interface. The model generator also initializes the BRAMs with the base hypervectors. For this end, F5-HD exploits a fixed, predetermined hypervector as the seed vector, and generates the remaining $t_{iv}-1$ hypervectors according to the procedure explained above. In the cases the user already has a trained model (i.e., base and class hypervectors), F5-HD allows direct initializing of these hypervectors.

The next step generates the controller, which statically schedules F5-HD operations. The main scheduling tasks include loading the training or inference data from off-chip memory into local BRAMs, switching between the training, inference, and/or retraining modes. It also generates a controller to allocating and deallocating PUs for retraining, and essentially controlling the enabler of different processing units in the granularity of clock cycle. Eventually, the logic and controller are merged to realize the concrete accelerator architecture.

Many HD computing methods use binarized class hypervectors to substitute the costly Cosine similarity operation in inference phase with the simpler Hamming distance operation. Although binary representation increases the throughput, in the majority of classification problems, the accuracy of the binarized HD model is not comparable to that of the HD using fixed-point dimensions. In addition to the fixed-point and binary HD models, we provide power-of-two representation in the class hypervectors which replaces the costly multiplication operations with shift operations in the hardware level. Though power-of-two representation covers discrete values, it supports a larger range of numbers which helps to compensate for the accuracy drop. FIG. 3 compares the accuracy and execution time of HD models for four different datasets on CPU. Fixed-point model, on average, attains 5.7% and 20.5% higher accuracy compared to, respectively, power-of-two and binary models. The binary model surpasses in terms of the throughput, wherein it yields 6.5× and 2.2× performance improvement over the fixed-point and power-of-two models.

Similar to the training of Deep Neural Networks (DNNs), training of HD model can be enhanced by iterating over the input data, as described above. Note that, as in the case of DNNs, to avoid overfitting, a learned model does not necessarily predict the correct class for all data of the same training dataset, however, the accuracy can be improved by multiple iterations (equivalent to multiple epochs in the context of deep learning). The first epoch of F5-HD generates all query hypervectors (one per each input data) and aggregates the hypervectors with the same label l as the class hypervector $\vec{C}_l$. We denote this single-epoch learning as model initialization. During the subsequent optional epochs (referred to as retraining), which either can be specified by the user or F5-HD itself continues until the accuracy improvement diminishes, under the management of the scheduler, F5-HD enhances the model by discarding the attributes of the mispredicted query hypervector $\vec{H}$, from the mispredicted class hypervector $\vec{C}_{H'}$, and adding it to the correct class hypervector $\vec{C}_H$ Retraining can be carried out immediately after model initialization, or enabled later by halting the inference phase. The principal difference between the model initialization and retraining is the latter requires prediction (i.e., inference) as well while the former simply performs aggregation. This is supported by F5-HD architecture.

Depending on the generality of the training data and the HD model, in certain cases, the accuracy of the classifier for real-world data might drop. To resolve this issue, F5-HD provides an online retraining solution which can be enabled during the runtime by user. During the online retraining, F5-HD updates the class hypervectors based on a new set of training data in real-time. Thus, F5-HD is capable of conducting model initialization, retraining, inference, and simultaneous retraining-inference (online retraining). In the inference mode, the system works normally and all the resources are assigned to calculate the similarity metric. In the online hybrid retraining mode, the system executes both inference and retraining and allocates a portion of the resources for each task. In this mode, the part of the FPGA that executes the inference task always uses the updated model during the online retraining. Therefore, in each retraining iteration, the model is updated and the inference employs the recently updated class hypervectors for prediction. Upon finishing the online retraining, all FPGA resources will be reallocated back for inference purpose.

Inputs of F5-HD are vectors of extracted features, namely feature maps, which are stored in the off-chip memory. The scheduler partially loads the feature maps to the input buffer memory, distributed in FPGA local memory (Block RAMs). The encoding module generates the encoded query hypervectors of the input vector and stores them in the encoding buffer. The generated query hypervectors are then pipelined in a segregated (dimensional-wise) manner, fed to the associative search module to perform parallel similarity check with all class hypervectors, yet in a dimensional-wise manner. This requires to store the partial sums of the dimensions products. The encoding and associative search work in a synchro-nous manner to avoid logic starvation and maximize the physical resource utilization. Thus, in F5-HD, the encoding module outputs the same number of query hypervector dimensions that the associative search processes per cycle. Since the classification of an input vector takes multiple cycles and utilizes all the FPGA resources, the parallelization is in per-input level. That is, classification operations for a single input are pipelined and parallelized among all FPGA resources, and the subsequent input vector is loaded after the process of the current input accomplishes. Increasing F5-HD's throughput necessitates increasing the degree of parallelism in the associative search, which, in turn, demands reading higher encoded dimension per cycle. Therefore, owing to the high supported degree of parallelism in HD computing, the only performance barriers of F5-HD are the available resources and power budget.

Both training and inference processes in HD computing need to encode the input feature hypervector, $\vec{V}_{in}$, to the query hypervector $\vec{\mathcal{H}}$, using basic permutation and addition on the base hypervectors. As previously shown by Equation 3, each element vi of the input hypervector, based on its value $|vi| \in (\mathcal{F}0, \mathcal{F}_1, \ldots \mathcal{F}t_{iv})$, selects the corresponding base hypervector $\vec{h}v_{vi}$ (out of $t_{iv}$ possible base hypervectors), rotated left by i bits, to make up the query $\vec{\mathcal{H}}$. FIG. 3(a) illustrates the encoding scheme, in which the constituting bits of each dimension $d_i$ of the query hypervector $\vec{\mathcal{H}}$ are distinguished by the same color. Accordingly, to build up e.g., dimension $d_0$ ($d_1$) from $\vec{\mathcal{H}}$, $v_0$ of the input hypervector chooses among $b_0$ ($b_1$) of the base hypervectors, $v_1$ selects from $b_{Div}$ ($b_0$), $v_2$ selects from $b_{Div}-1$ ($b_{Div}$), etc. Recall that the dimensions of hypervectors are 1-bit wide (denoted by $b_i$s in the figure) that aggregate in a dimension-wise scheme and form $d_i$s, which can be in various widths and representations, e.g., fixed-point, binary, and power-of-two.

The naïve encoding scheme abstracted in FIGS. 4A-D, however, both computationally and communicationally intractable: at each cycle it requires $t_{iv} \times D_{hv}$ bits (multiples of 10K) of the base hyper-vectors to be read from the BRAMs, and $D_{hv}$ population counters (PopCounters), each with input bitwidth of $D_{iv}$. To resolve this, as the dimensions of the query hypervector $\vec{\mathcal{H}}$ can be calculated independently, we segregate the output query vector $\vec{\mathcal{H}}$ into the segments of S dimensions whereby at each clock cycle one segment is processed. Thus, processing the entire $\vec{\mathcal{H}}$ takes Dhv/s cycles. This is conceptualized in FIG. 4(b), which shows the physical locations of the hypervectors bits required to build up the first S dimensions of $\vec{\mathcal{H}}$. Accordingly, $t_{iv} \times (S+D_{iv})$ different bits are needed to be read to create the query $\vec{\mathcal{H}}$. Notice that this approach retains the alignments of the bits; for every $S+D_{iv}$ consecutive bits (per base hypervector) read from the BRAM(s) at each cycle, bits 0 to $D_{iv}$ are conveyed to $0^{th}$ PopCounter to form $d_0$, bits 1 to $D_{iv}+1$ form the $d_1$ via the $1^{st}$ PopCounter, and so on. Therefore, no logic or routing overhead is associated to align the read data.

Figure 4:
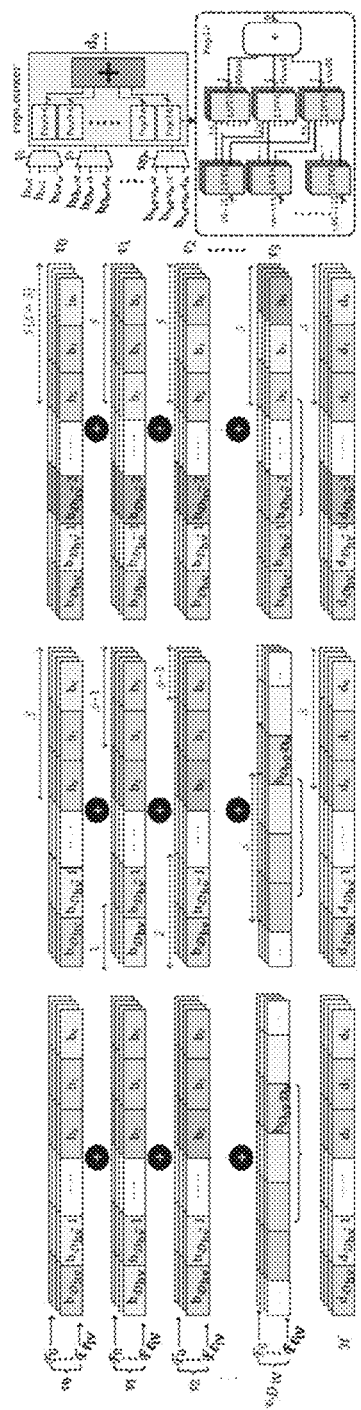
FIGS. 4A-D illustrate (a) naïve encoding scheme (b) baseline segmented encoding (c) the encoding scheme (d) implementation of the population counter in some embodiments according to the invention.

Beside segmented processing, we further reduce the number of BRAM accesses by proposing a novel encoding scheme. The proposed encoding, first, permutes the bits of the base hypervectors locally, i.e., intra-segment, rather than the entire hypervector. After S permutations, e.g., after the first S features (vi s) in the input hypervector, the segments accomplish an entire permutation; hence the base hypervector for the $0^{th}$ and '$S+1^{th}$' features essentially become the same. This removes the information associated with local and/or temporal locality of the input features. In such case, we perform inter-segment permutation in which the segments are permuted to left globally, whereby bit $b_k$ takes the place of bit $b_{S+k}$. In this scenario, the first S features (vis) need S bits of the first segment, the second S input features require S bits of the right segment (which will be shifted to left by one segment), and so on. Thereby, the proposed encoding needs $t_{iv} \times (S \times Div/S) = t_{iv} \times Div$ bits (S bits of all $t_{iv}$ base hypervectors for every Div/S input features) to produce an output segment. This needs S $D_{iv}$—width PopCounter. FIG. 4(c) conceptualizes the proposed encoding scheme.

The hand-crafted hardware realization of the proposed PopCounter, which contributes to significant portion of the encoder and overall area footprint, is demonstrated by FIG. 4(d). The main building block of the implemented PopCounter is Pop36 that produces 6-bit output for a given 36-bit input. It is made up of bunches of three LUT6 that share six inputs and output the 3-bit resultants, which are summed up together in the subsequent stage according to their bit order (position). We instantiated FPGA primitive resources, e.g., LUT6 and FDSE to build up the pipelined PopCounter, which is ~20% area efficient than simple HDL description. The impact of PopCounter intensifies further in binary HD models wherein the associative search module is relatively small.

Figure 5:
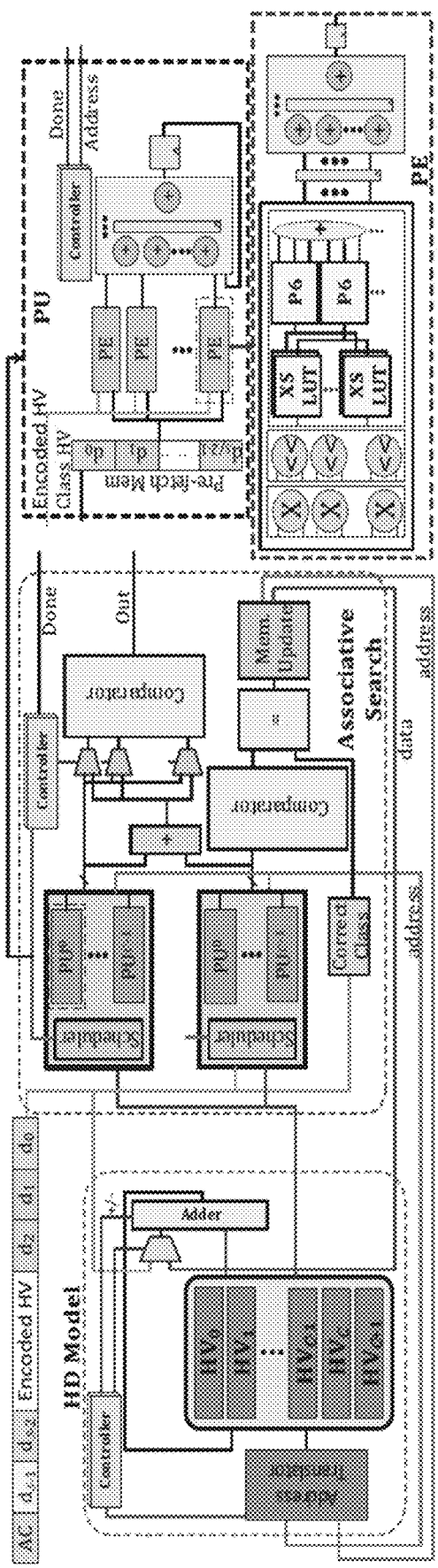
FIG. 5 is an overview of the HD classification, including and HD model, associative search, Pus and PEs structure in some embodiments according to the invention.

The architecture overview of F5-HD is illustrated in FIG. 5, which incorporates the required modules for training, inference and online retraining of the HD computing. The main template architecture of F5-HD includes two levels of hierarchy: a cluster of Processing Units (PUs), each comprises specific number of Processing Elements (PEs). The assignment of PUs and PEs are selected in a way that maximizes the datreusability.

F5-HD contains 2×|C| PUs where |C| is the number of classes (labels). In the course of inference, all C PUs perform similarity checking. Every cycle, each PU receives s/2 of the query hypervector's dimensions (recall that S is the segment length generated by encoder at each clock cycle, as discussed). Thus, together, a pair of PUs process all S dimensions of the segment, and hence, 2×|C| PUs are able to check similarity between all |C| classes in parallel. Every PUk also contains a local buffer to prefetch (a portion of) the associated class hypervector $C_k$ in advance to suppress the BRAM's read delay. Additionally, PU includes a pipelined accumulator to sum up and store the results of PEs, to be aggregated with the results of the next s/2 dimensions.

Each PE contains a predetermined number of multipliers and adders (based on the FPGA size, normally eight fixed-point multipliers). However, the number of PEs in each PU which together with the PopCounters of encoder determine the level of parallelism (value of S), is specified according to the available FPGA resources. The available resources may be restricted by the power budget, as well. PEs generally perform the similarity check through calculating the dot-product of the query and class hypervectors, though it requires different type of operations for different model precision (different representations of dimensions). Typically, PEs consist of fixed-point multipliers, which we map them to FPGA DSPs. Utilizing power-of-two HD model replaces the multiplications with shift operations in which each dimension of the query $\vec{\mathcal{H}}$ is shifted by the value specified by the corresponding element of the class hypervector. Using binary HD model further simplifies this to element-wise XNOR operations, followed by reduction or population count, in F5-HD XNOR and population count operation is combined and implemented in XS LUTs followed by a layer of 6-input population count logic (P6 LUTs). Therefore, the advantage of a hand-crafted PopCounter gets further noticed in the binarized HD models. To generate HD architectures of different accuracy, F5-HD produces PEs with the specific structure, the template architecture is retained.

Model initialization starts with randomly initializing of the class hypervectors as well as generating the orthogonal, base hypervectors. Since model initialization is carried out only once in the entire course of the HD computing, we try to simplify this stage and do not allocate specialized resources. Therefore, we load both the base hypervectors and initial (random) class hypervectors during initial programming of the FPGA. Thereafter, all training input data is encoded and then added to the initial class hypervector. We use the same encoding module used for generating the query hypervectors, which, at each cycle, generates S dimensions of the encoded input vector and adds it back to the corresponding class hypervector using the S-wide adder incorporated in the model module (see FIG. 5).

FIG. 5 demonstrates the structure of the inference block in F5-HD architecture. The encoded query hypervector H® is broadcast to all PUs, each of which shares s/2 corresponding dimensions of its prefetched associated class hypervector between its PEs. PUs accumulate the sum-of-the-products to be aggregated with the subsequent segments' results. After processing the entire query hypervector accomplished, i.e., after Dhv/s cycles, the final similarity resultant of each class is obtained by adding the accumulated values of each PU pair. Eventually, the comparator outputs the class index with the greatest similarity metric.

Remember that during the retraining stage, the HD model performs inference on the same input data and, in the case of misprediction, updates the necessary classes, i.e., the correct and mispredicted classes. In F5-HD architecture, it is performed by passing the mispredicted query hypervector to the HD model module, which adds (subtracts) the query to (from) the correct (mispredicted) class. The correct class index is specified by the label of input data. In summary, retraining involves with inference, followed by a potential model update.

In this operating mode, the encoder generates s/2 dimensions for the inference, and s/2 for the retraining data. Using the upper pairs of PUs (see FIG. 5), inference executes by ½ of its typical throughput and takes 2×Dhv/s per input. The other half of PUs perform retraining, which, as already discussed, includes an inference followed by a potential model update. In the case of a misprediction which demands a model update, the inference should be halted to update the required classes. To avoid this, we have dedicated two additional hypervectors to write the updated classes (hypervectors). Upon a misprediction, the query hypervector will be subtracted from the mispredicted class, which is already being read by the inference module segment by segment, so no additional read overhead will be imposed. Thereafter, the hypervector will be added to the correct class. After updating each of the correct and mispredicted hypervectors, the address translator modifies the physical address of the two classes to point the right hypervector. Note that till the mispredicted classes are updated, the HD model works with the previous classes.

As the number of PUs are fixed, the number and size of PEs (i.e., number of multipliers per PE) per each PU affect the level of parallelism in HD computing. This, however, is also restricted by the number and bandwidth of on-chip RAMs as well as the dictated power budget. The following equations summarize the constraint of different resources F5-HD assumes in generating F5-HD architecture.

$$\overbrace{A_{PopCounter} \times S}^{encoding} + \overbrace{2 \times |C| \times N_{PE} \times A_{PE}}^{Similarity\ checker} < LUT_{max} \quad (8)$$

$$\overbrace{2 \times |C| \times N_{PE} \times DSP_{PE}}^{Similarity\ checker} + \overbrace{S}^{model\ updater} < DSP_{max} \quad (9)$$

$$\frac{\overbrace{|C| \times S \times bitwidth}^{HD\ model\ read\ access} + \overbrace{\mathcal{D}_{io} \times \ell_{iv}}^{encoding}}{36} < BRAM_{max} \quad (10)$$

In these equations, AX denotes the area of module X in terms of number of LUTs, NP E is the number of PEs in each PU, DSPP E is the number of DSPs per PE (in the case of fixed-point models). We also map the adder of the model updater into DSP blocks, as evident from Equation 9. Notice that, in the proposed architecture, the computation is limited by BRAM accesses (rather than BRAM memory). Thus, we have assigned the constraint on BRAM bandwidth. It is also noteworthy that our experiments revealed the design is barely routable for LUT utilization rates above ~90%. Hence, $LUT_{max}$ is set to 90% of the device LUTs.

The entire F5-HD software support including user interface and code generation has been implemented in C++ on CPU. The software customizes template blocks to generate an optimized hardware for each application, based on the user's optimization, accuracy, and power preferences. The output of F5-HD framework is an FPGA-mapped implementation of a given HD application in Verilog HDL. We verify the timing and the functionality of the F5-HD by synthesizing it using Xilinx Vivado Design Suite. The synthesized code has been implemented on Kintex-7 FPGA KC705 Evaluation Kit. We used Vivado XPower tool to estimate the device power.

We compared the performance and energy efficiency of F5-HD accelerator running on FPGA with AMD R9 390 GPU and Intel i7 7600 CPU with 16 GB memory. For GPU, the HD code is implemented using OpenCL and is optimized for performance. We used Hioki 3334 and AMD CodeXL for the power measurement of CPU and GPU, respectively. We implement F5-HD on three FPGA platforms including Virtex-7 (XC7VX485T), Kintex-7 (XC7k325T), and Spartan-7 (XC7S100) to evaluate the efficacy of F5-HD on various platforms with different available resources, power characteristics and power budget. We evaluate the efficiency of F5-HD on four practical workloads including Speech Recognition (ISOLET): the goal is to recognize voice audio of the 26 letters of the English alphabet, Activity Recognition (UCIHAR): the objective is to recognize human activity based on 3-axial linear acceleration and 3-axial angular velocity, Physical Activity Monitoring (PAMAP): the goal is to recognize 12 different human activities such as lying, walking, etc., and Face Detection: the goal is to detect faces among Caltech 10,000 web faces dataset from negative training images, i.e., non-face images which are selected from CIFAR-100 and Pascal VOS 2012 datasets.

Encoding module is used in both training and inference. This encoder works in a pipeline stage with the initial training and associative search (similarity checking) modules. Thus, the more generate dimensions by the encoding module, the more throughput F5-HD can achieve. To evaluate the effectiveness of our proposed encoding algorithm, we compare the hardware implementation of F5-HD encoding with a baseline HD computing encoding.

FIG. 6 compares the number of generated dimensions per cycle in F5-HD and the baseline encoding modules. In the baseline segmented encoding, to generate S dimensions of the encoded hypervector, we showed that HD architecture needs to read $S+D_{iv}$ dimensions of each base hypervector, where S and $D_{iv}$ are the segment length and length of the input hypervector, respectively. In contrast, as we explained above, F5-HD encoding module is implemented using a hardware-friendly permutation as well as LUT-based XNOR and PopCount modules that reduces the resource usage. Our evaluation on data points with 64 features shows that F5-HD encoder can provide 1.5× higher throughput as compared to the baseline segmented encoder. This throughput improvement increases to 1.9× for data points with 512 features. This is because the delay of the adder (population counter) dominates as the number of features (hence, the size of the population counter) increases.

Figure 7:
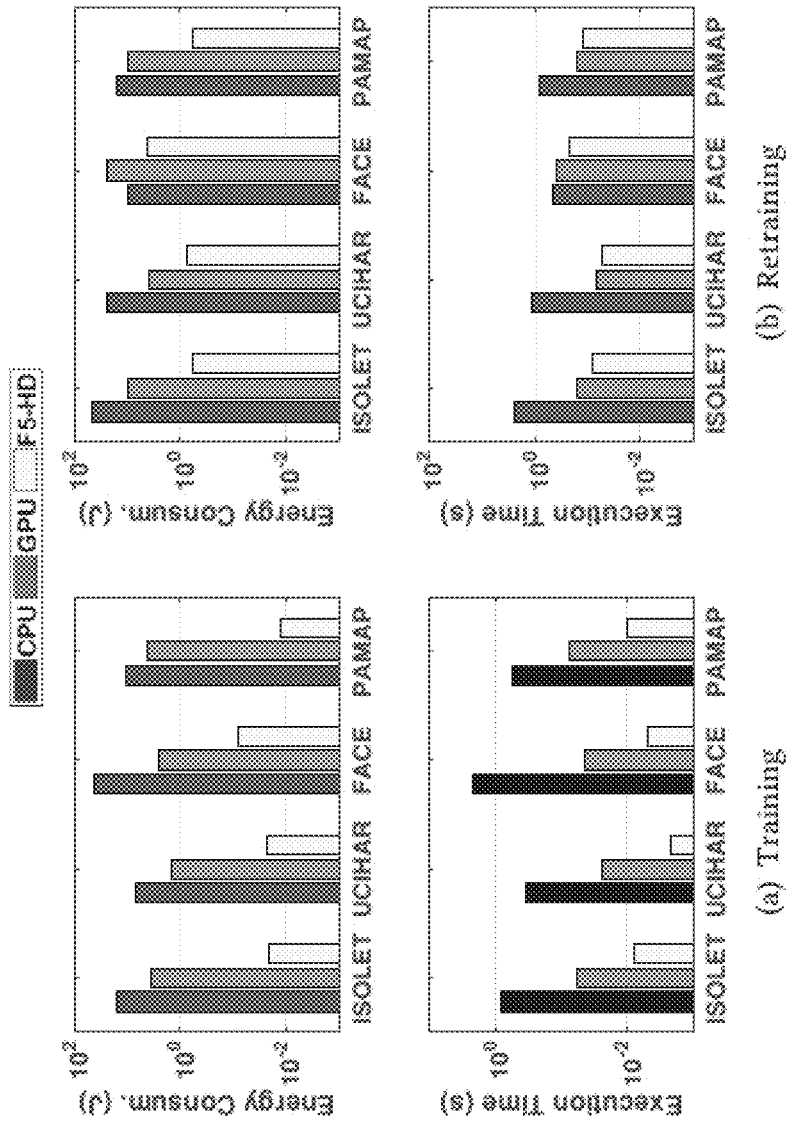
FIGS. 7A-B are energy consumption and execution time of F5-HD versus other platforms during (a) training and (b) one epoch of retraining in some embodiments according to the invention.

HD generates the initial model by a one-time passing through the training dataset. Regardless of the exploited models (viz., binary, power-of-two or fixed-point), in F5-HD we train the HD model using fixed-point operations and eventually we quantize the class hypervectors based on the defined model precision. FIG. 7(d) shows the energy consumption and execution time of HD running on Intel i7 CPU, AMD R9 390 GPU, and Kintex7 FPGA platforms during the initial training. The initial training consists of the encoding module which maps data points into high dimensional space and hypervectors aggregation which generates a hypervector representing each class. In conventional computing systems, e.g. CPU and GPU, the majority of training time is devoted to the encoding module, since these architectures have not been customized to process binary vectors in 10K dimensions. In contrast, F5-HD can implement the encoding module effectively using FPGA primitives. Our evaluation shows that F5-HD provides, on average, 86.9× and 7.8× (548.3× and 148.2×) higher energy efficiency and faster training as compared to GPU (CPU) platform, respectively.

Similarity checking (a.k.a associative search) is the main contributor to HD energy consumption and execution time during both retraining and inference. In retraining, associative search checks the similarity between a fixed-point query hypervector with all stored class hypervectors using cosine metric. Since the HD encoding is expensive on conventional computing units, in CPU and GPU implementations, the retraining processes on the encoded training data which are already stored in memory. In contrast, due to the efficient F5-HD encoding functionality and in order to reduce the off-chip memory access, F5-HD encodes the training data on every iteration. FIG. 7(b) compares the HD computing retraining efficiency on three CPU, GPU, and FPGA platforms. The results are reported for F5-HD retraining on a single epoch. Our evaluation shows that F5-HD provides 1.6× and 10.1× faster computation as compared to GPU and CPU platforms, respectively. Although the GPU performance is comparable to F5-HD, F5-HD provides 7.6× higher energy efficiency due to its lower power consumption.

Figure 8:
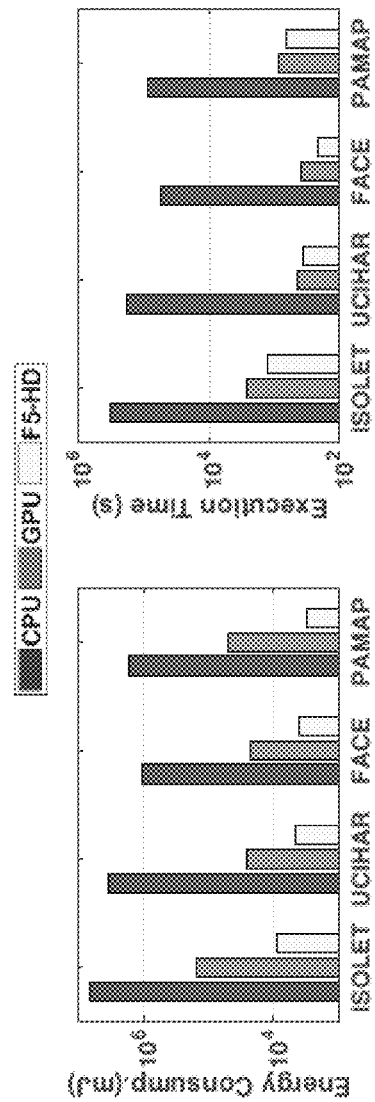
FIG. 8 are graphs of energy consumption and execution time of HD during inference running on different platforms in some embodiments according to the invention.

FIG. 8 compares the energy consumption and execution time of HD inference running on different platforms. All results are reported for the case of using the fixed-point model. The inference includes the encoding and associative search modules. The encoding module maps a test data into high-dimensional space, while the associative search module checks the similarity of the encoded data to pre-stored class hypervectors. The results show that the efficiency of applications changes depending on the number of features and the number of classes. For applications with a large feature size, F5-HD requires a costly encoding module, while applications with a large number of classes, e.g., ISOLET, devote the majority of the energy/execution time to perform the associative search. Our evaluation shows that F5-HD achieves 11.9× and 1.7× (616.8× and 259.9×) higher energy efficiency and faster inference as compared to GPU (CPU) platform respectively.

Figure 9:
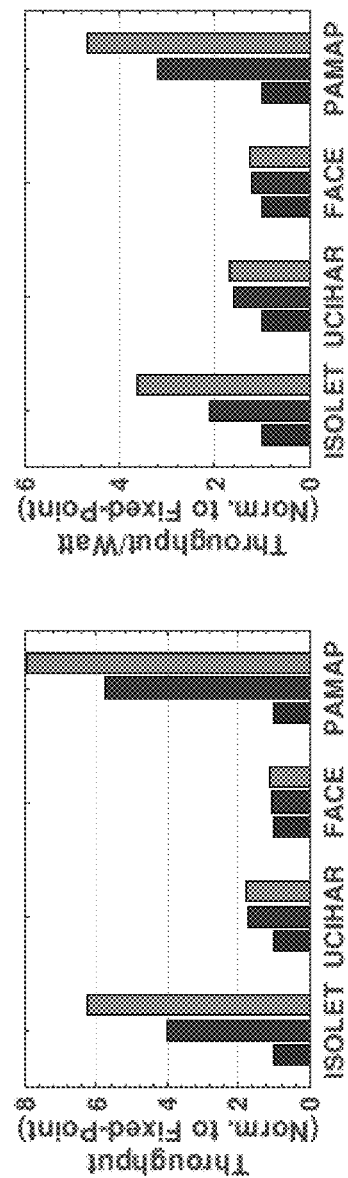
FIG. 9 are graphs of throughput and throughput/Watt in F5-HD using fixed-point, power-of-two, and binary models in some embodiments according to the invention.

F5-HD can have different design choices for inference. Using fixed-point module F5-HD provides the maximum classification accuracy but relatively slower computation. Using binary and power of-two model, the encoding dominates F5-HD energy/execution time, while for the fixed-point model the majority of resources are devoted to the associative search. F5-HD removes the multiplications involved in cosine similarity using power-of-two model, resulting in higher computation efficiency. Finally, the binary model is the most efficient F5-HD model, where the similarity check can be performed by using Hamming distance. FIG. 9 shows the F5-HD inference efficiency using power-of-two and binary models. All results are normalized to the throughput and throughput/Watt of F5-HD with fixed-point model. For applications with low feature size, e.g., PAMAP, the encoding module maps a large number of data points into high-dimensional space. This makes the associative search a dominant part of inference computation when using fixed-point model. On the other hand, in face detection with a low number of classes and high feature size, the encoding dominates the F5-HD resource and efficiency. Our evaluation shows that F5-HD using binary and power-of-two models can achieve on average 4.3× and 3.1× higher throughput than F5-HD using fixed-point model. In addition, the binary and power-of-two models provide 2.1× and 1.5× higher throughput/Watt as compared to F5-HD using fixed-point model.

FIG. 10 lists the average Kintex FPGA resource utilization implementing F5-HD using fixed-point, power-of-two, and binary models. The results are reported for F5-HD supporting both training and inference. Our evaluation shows that the fixed-point model utilizes the majority of the FPGA DSPs in order to perform the similarity check of the inference/retraining. In contrast, with binary and power-of-two models have much lower DSP utilization, as the majority of their inference computation includes bitwise operations that can be efficiently performed using LUTs and the PopCounter. In addition, F5-HD with the binary model has the lowest BRAM utilization as it can store the trained HD model using significantly lower memory size. FIG. 10 also provides the average power dissipation of the Kintex FPGA. The results indicate that in the fixed-point model, the number of DSPs limits the FPGA throughput, thus F5-HD consumes lower power consumption due to its overall low LUT utilization. In contrast, F5-HD using binary model highly utilizes the available LUTs on the FPGA resulting in high throughput and higher power consumption.

Figure 11A:
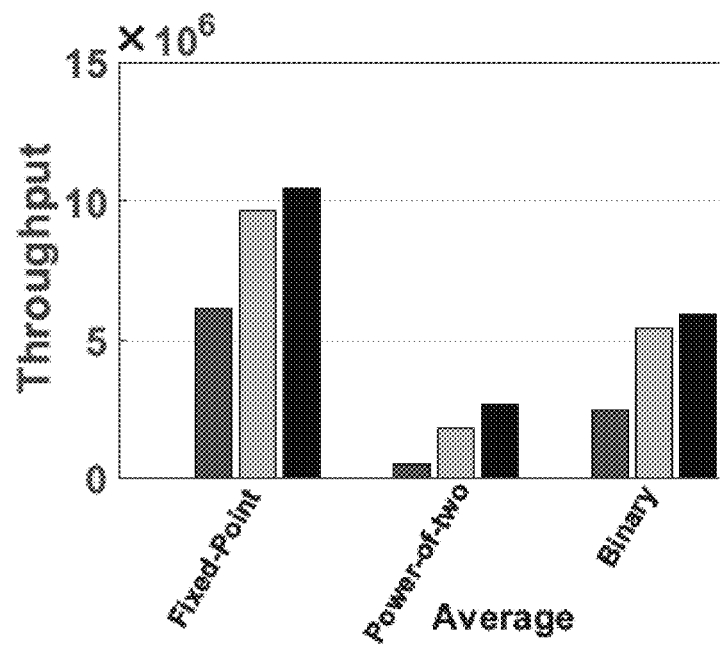
FIG. 11A is a graph of average throughput of different FPGAs implementing F5-HD with fixed-point, power-of-two, and binary models in some embodiments according to the invention.

To demonstrate the generality of F5-HD and further investigate its efficiency, we implement it on three different FPGA platforms. FIG. 11(a) compares the average throughout of F5-HD running different HD applications on these three platforms. Our evaluation shows that Virtex implementing fixed-point model provides 12.0× and 2.5× higher throughput as compared to Spartan and Kintex platforms. The efficiency of Virtex comes from its large amount of available DSPs (2,800 DSPs with 485K LUTs), which can be used to accelerate associative search. However, F5-HD using power-of-two and binary models mostly exploit LUTs for FPGA implementation, resulting in higher throughput especially on Spartan with few numbers of DSPs. For example, Spartan using binary model can achieve on average 5.2× higher throughput than F5-HD using fixed-point model. It should be noted that in all FPGA platforms the throughput of the binary model is proportional to the number of available LUTs in FPGAs.

Figure 11B:
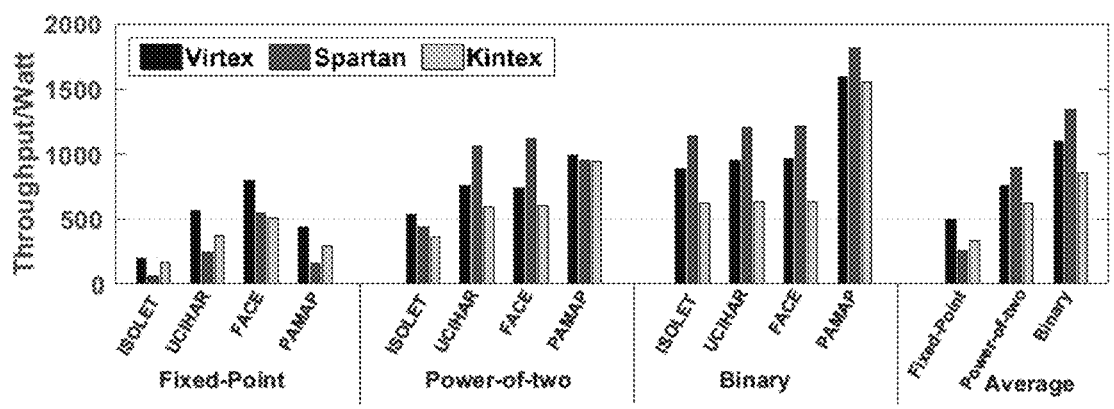
FIG. 11B is a graph of throughput/Watt of F5-HD implementing different applications on FPGA platforms in some embodiments according to the invention.

To compare the computation efficiency of different FPGAs, we eliminate the impact of available resources by using the throughput/Watt as the comparison metric. FIG. 11(b) shows the throughput/Watt of F5-HD implemented in different platforms. As the results show, Virtex with large number of DSPs provides the maximum throughput/Watt when implementing F5-HD using fixed point model. However, using power-of-two and binary models, Spartan provides the higher computation efficiency since most of F5-HD computation can be processed by LUTs. For example, using the fixed-point model, Virtex can provide 2.0× and 1.5× higher throughput/Watt as compared to Spartan and Kintex, respectively. However, using the binary model, Spartan provides 1.2× and 1.5× higher throughput/Watt than Virtex and Kintex respectively.

The efficiency of different FPGAs also depends on the application, i.e., number of features and classes. For applications with small feature size (e.g., PAMAP), F5-HD can encode a larger amount of data at a time, thus the associative search in inference requires higher number of DSPs and BRAM accesses to parallelize the similarity check. This makes the number of DSPs the bottleneck of computation when using a fixed-point model for PAMAP application. PAMAP using power-of-two model eliminates the majority of DSP utilization required to multiply a query and class hypervector, thus the number of BRAMs becomes the computation bottleneck. These results are more obvious on the Spartan FPGA with limited BRAM blocks.

As described herein, the desired power budget is an input to F5-HD framework that can be dictated by the users before implementation of each application, which impacts the level of parallelism. When the user defines a desired power budget ($P_{target}$), F5-HD tries to determine the number of PEs per PU such that the implementation satisfies the power constraint. In practice, F5-HD may not precisely guarantee the desired power due to the fact that the number of PEs per PU has discrete values and the size of the application and its power consumption depend on this discrete parameter. Additionally, our initial estimation of the power consumption is according to the logical connectivity of the building blocks and may not accurately estimate the impact of signals power, which is routing-dependent. Therefore, the measured power after implementation ($P_{meas}$) might have fluctuations around the target power level. Here we define the power fluctuation as $\Delta P = |P_{meas} - P_{target}| / P_{target}$.

FIG. 12 lists the average throughput (TP) and $\Delta P$ after imposing the power budget. The table also shows the normalized throughput under power constraints to the nominal throughput when no power budget is employed. The results are reported for the cases that the power budget is defined as 25% and 50% of maximum power (power of F5-HD running on the same device without power restriction) as the desired power level. Our evaluations show that our framework can generate HD accelerator that lays within $\Delta P = 18\%$ of the target power. The power fluctuation becomes large when the targeted power is low as the magnitude of misprediction ($|P_{meas} - P_{target}|$) almost remains the same while the base power $P_{target}$ reduces.

Therefore, the advantage of a hand-crafted PopCounter gets further noticed in the binarized HD models. To generate HD architectures of different accuracy, F5-HD produces PEs with the specific structure, the template architecture is retained.

The Appendix includes a paper titled "F5-HD: Fast Flexible FPGA-based Framework for Refreshing Hyperdimensional Computing," (10 pages), which is incorporated herein in its entirety.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

What is claimed:

1. A method of defining an implementation of circuits in a programmable device, the method comprising:
    receiving a plurality of specifications for a hyperdimensional (HD) computing machine learning application for execution on a programmable device;
    determining parameters for a template architecture for HD computing machine learning using the plurality of specifications, the template architecture including an HD hypervector encoder, an HD associative search unit, programmable device pre-defined processing units, and programmable device pre-defined processing elements within the pre-defined processing units; and
    generating programmable device code configured to specify resources to be allocated within the programmable device using pre-defined circuits defined for use in the programmable device using the determined parameters for the template architecture,
    wherein the template architecture supports concurrent execution of training and inference operations by dynamically allocating programmable device resources in response to real-time operational requirements, and
    wherein the programmable device code comprises instructions for reconfiguring the programmable device by adjusting the allocation and utilization of the programmable device resources in response to changes in an operational state of the HD computing machine learning application.

2. The method of claim 1 further comprising:
    defining a controller for operation within the programmable device configured to coordinate operations of the HD computing machine learning application implemented within the programmable device according to the programmable device.

3. The method of claim 1, wherein the HD hypervector encoder converts data inputs into HD vectors for processing in the HD computing machine learning application.

4. The method of claim 3, wherein the HD associative search unit performs search operations within the HD vectors to identify relevant data.

5. The method of claim 1, where the programmable device code generated for the programmable device specifies which resources are to be allocated to each of the pre-defined circuits.

6. The method of claim 1, wherein the programmable device is configurable for different HD computing machine learning applications by changing the plurality of specifications and parameters for the template architecture.

7. The method of claim 1, wherein the programmable device is capable of being updated and reconfigured over time to improve its performance in executing HD computing machine learning applications.

8. The method of claim 1, further comprising:
    designing a circuit implementation plan based on the determined parameters for the template architecture;
    generating the programmable device code using the circuit implementation plan; and
    integrating the programmable device code into the programmable device to implement the circuits required for the HD computing machine learning application.

9. The method of claim 1, wherein the changes in the operational state of the hyperdimensional (HD) computing machine learning application include transitions between training, inference, and retraining modes.

10. The method of claim 1, further comprising:
    configuring the HD hypervector encoder included in the template architecture to perform real-time conversion of incoming data streams into HD vectors, wherein the real-time conversion process is optimized based on the real-time operational requirements of the HD computing machine learning application, and
    configuring the HD associative search unit included in the template architecture to dynamically prioritize search operations within the HD vectors during the concurrent execution of training and inference operations, wherein the prioritization is adjusted based on current allocation of programmable device resources.

11. Non-transitory computer readable media comprising computer-executable instructions that, when executed by a computing system, cause the computing system to:
    receive a plurality of specifications for a hyperdimensional (HD) computing machine learning application for execution on a programmable device;
    determine parameters for a template architecture for HD computing machine learning using the plurality of specifications, the template architecture including an HD hypervector encoder, an HD associative search unit, programmable device pre-defined processing units, and programmable device pre-defined processing elements within the pre-defined processing units; and generate programmable device code configured to specify resources to be allocated within the programmable device using pre-defined circuits defined for use in the programmable device using the determined parameters for the template architecture, wherein the template architecture supports concurrent execution of training and inference operations by dynamically allocating programmable device resources in response to real-time operational requirements, and wherein the programmable device code comprises instructions for reconfiguring the programmable device by adjusting the allocation and utilization of the programmable device resources in response to changes in an operational state of the HD computing machine learning application.

12. The non-transitory computer readable media of claim 11, wherein execution of the computer-executable instructions further cause the computing system to:

define a controller for operation within the programmable device configured to coordinate operations of the HD computing machine learning application implemented within the programmable device according to the programmable device.

13. The non-transitory computer readable media of claim 11, wherein the HD hypervector encoder converts data inputs into HD vectors for processing in the HD computing machine learning application.

14. The non-transitory computer readable media of claim 13, wherein the HD associative search unit performs search operations within the HD vectors to identify relevant data.

15. The non-transitory computer readable media of claim 11, wherein the programmable device pre-defined processing units include hardware components for performing specific tasks in the HD computing machine learning application.

16. The non-transitory computer readable media of claim 11, where the code generated for the programmable device specifies which resources are to be allocated to each of the pre-defined circuits.

17. The non-transitory computer readable media of claim 11, wherein the programmable device is configurable for different HD computing machine learning applications by changing the plurality of specifications and parameters for the template architecture.

18. The non-transitory computer readable media of claim 11, wherein the computer-executable instructions further cause the computing system to:

configure the HD hypervector encoder to map input data features into corresponding hypervectors, wherein encoding is dynamically adjusted based on operational parameters of the HD computing machine learning application, and configure the HD associative search unit to perform similarity searches within the encoded hypervectors, wherein search operations are prioritized and adjusted based on the real-time resource allocation within the programmable device.

* * * * *